(12) United States Patent
Klein et al.

(10) Patent No.: US 8,061,010 B2
(45) Date of Patent: Nov. 22, 2011

(54) METHOD AND SYSTEM FOR PREVENTING INTRUSION OF POURED CONCRETE IN AN ELECTRICAL OR TELECOMMUNICATIONS BOX

(75) Inventors: David T. Klein, Alsip, IL (US); Donald M. Klein, McHenry, IL (US)

(73) Assignee: DDK Innovations Inc., Alsip, IL (US)

( * ) Notice: Subject to any disclaimer, the term of this patent is extended or adjusted under 35 U.S.C. 154(b) by 1268 days.

(21) Appl. No.: 11/695,291

(22) Filed: Apr. 2, 2007

(65) Prior Publication Data

US 2008/0236857 A1    Oct. 2, 2008

(51) Int. Cl.
*B21B 1/46* (2006.01)
*H02G 1/00* (2006.01)

(52) U.S. Cl. ........................ 29/527.2; 174/50

(58) Field of Classification Search .............. 29/527.2, 29/897, 897.3, 897.312, 897.34, 418, 422, 29/426.6, 450, 458, 460, 801, 235; 174/50, 174/53, 58; 220/3.4, 3.2, 3.3
See application file for complete search history.

(56) References Cited

U.S. PATENT DOCUMENTS

| | | | | |
|---|---|---|---|---|
| 5,404,676 A | * | 4/1995 | Devlin | 49/463 |
| 6,998,531 B2 | | 2/2006 | Hull | |
| 7,075,005 B1 | * | 7/2006 | Drane | 174/50 |

* cited by examiner

*Primary Examiner* — John C Hong
(74) *Attorney, Agent, or Firm* — Drinker Biddle & Reath LLP

(57) ABSTRACT

The present invention is directed to a method and system for preventing intrusion of viscous poured concrete into electrical or telecom boxes using resilient members having a top surface that fills the surface opening of the box it is inserted into where the spring back of the resilient member insures a proper seal around the surface opening. An example method for preventing intrusion of poured concrete into a box comprises selecting a suitable member for insertion into the box, compressing the member, inserting it into the box, and pouring concrete around the box. The resilient member may subsequently be removed and reused in another box. In another example method, a supply of resilient members of different shapes and sizes is provided for insertion into differently sized boxes.

15 Claims, 3 Drawing Sheets

METHOD AND SYSTEM FOR PREVENTING INTRUSION OF POURED CONCRETE IN AN ELECTRICAL OR TELECOMMUNICATIONS BOX

FIELD OF THE INVENTION

This invention pertains generally to installation of electrical and telecommunications boxes in concrete structures. This invention pertains more particularly to a method and system for preventing intrusion of viscous concrete into electrical and telecommunications boxes installed during the pouring of concrete structures.

BACKGROUND OF THE INVENTION

When concrete structures such as walls and floors are formed, electrical and/or telecommunications boxes (referred to collectively below as "electrical boxes") may be positioned in a form prior to pouring viscous concrete into the form. Once the form is in place, the boxes and associated conduits can be positioned in the form. Viscous concrete can then be poured into the form. After the concrete sets, the electrical boxes will be encased in the set concrete and can be used to house electrical or telecom wires in the concrete structure.

Currently, installers cover the opening of the electrical box with duct tape in order to prevent intrusion of poured concrete into the box. This is time consuming because every electrical box must be individually covered with duct tape. Also, if there is not a complete seal around the opening, concrete can enter into the electrical box making it difficult or impossible to pull wires through. Finally, once the concrete has been poured and set, the duct tape must be pulled or scraped off, piece by piece, and any concrete that got past the tape must be cleaned out. This process is described in U.S. Pat. No. 6,998,531, which references the use of duct tape and blown foam for preventing intrusion of poured concrete. The advantage of using blown foam is questionable, since it is still difficult and time consuming to remove the foam from the boxes. Also, blown foam may not produce an adequate seal against concrete intrusion. In view of the foregoing, there is a need for an improved system for preventing intrusion of poured concrete into electrical or telecom boxes.

BRIEF SUMMARY OF THE INVENTION

The present invention is directed to a method and system for preventing intrusion of poured concrete into electrical boxes. In one aspect the system may comprise resilient members for insertion into the boxes. Each resilient member has a configuration (e.g., size and shape) corresponding to the configuration of the box. The selected resilient member will have a top surface area large enough to fill the surface opening of the electrical box into which it is to be inserted.

In another aspect the invention comprises a method for preventing intrusion of poured concrete into an electrical box beginning with a selection of an appropriately sized resilient member for insertion into the box. Once selected, the appropriately sized resilient member is compressed and inserted into the box. After insertion into the box, the compressed member expands and the top surface of the resilient member fills the surface opening of the box with the spring back of the resilient member insuring a proper seal around the surface opening. The concrete is then poured around the box. After the concrete sets, the resilient member is removed from the box along with any concrete on its exposed surfaces. If desired, the resilient member may be reused in another box.

The invention also includes a method including providing a supply of resilient members of different shapes and sizes, those shapes and sizes corresponding to different shapes and sizes of electrical boxes. The method includes assembling a set of such differently sized resilient members that will be made available at a site where concrete is to be poured around electrical boxes. From this set of resilient members, members which correspond to each of the electrical boxes installed in the form are selected. Preferably, these selected members have a top surface that corresponds to the shape of the surface opening of the box and corresponding dimensions which are at least 2%, more preferably at least 10%, and most preferably greater than 20% longer than the sides of the box which define the surface opening of the box. The selected resilient members are then inserted into their corresponding boxes. Concrete is poured around the electrical boxes and once the concrete has set the members are removed from their respective boxes, which will be clear of concrete.

DETAILED DESCRIPTION OF THE EMBODIMENTS

Figure 1:
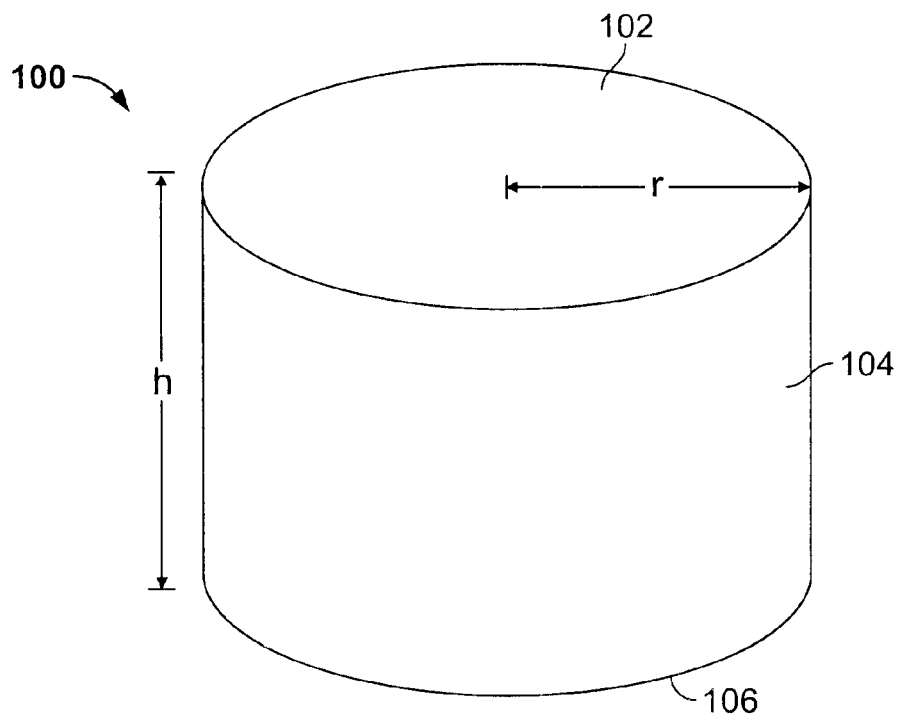
FIG. 1 shows a perspective view of an embodiment of a resilient member in accordance with the present invention.

Referring now to the figures, a system and method are provided for preventing intrusion of poured concrete into an electrical box. In FIG. 1, a first embodiment of a resilient member 100 that may be employed in the present system and method is shown. Resilient member 100 may be made of various resilient or elastomeric materials, such as any material known in the art that can be compressed and will spring back to its original shape. Also, it is preferred that the material be generally waterproof. Exemplary materials include rubber, foam rubber, sponge and latex foam. One preferred material for resilient member 100 is open-celled polyurethane foam. A particularly preferred open-celled polyurethane foam material has a density between about 1.1 pounds per cubic feet and about 2.0 pounds per cubic feet.

Resilient member 100, which is best suited for generally cylindrical electrical boxes, includes a top surface 102, an annular side surface 104 and a bottom surface 106. In FIG. 1 the resilient member 100 has a radius r and a height h. In one example, radius r of resilient member 100 is 2¼ inches and its height h is 3½ inches. However, resilient member 100 is not intended to be limited to any particular dimensions. Also, while resilient member 100 as shown in FIG. 1 is cylindrically shaped, the resilient member can have any appropriate regular or irregular configuration including but not limited to hemispherical, cubic or parallelepiped.

Figure 2:
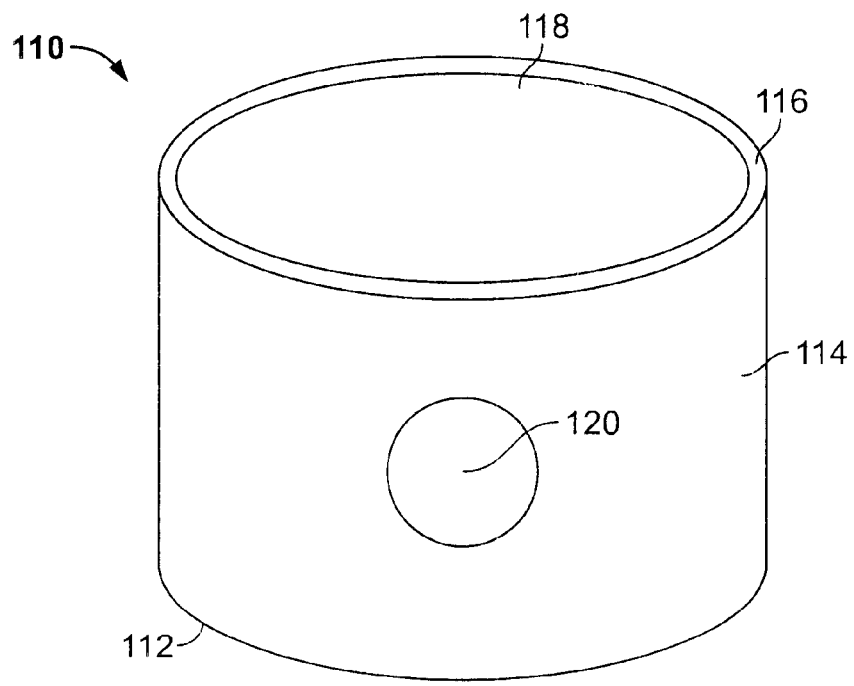
FIG. 2 shows a perspective view of an embodiment of an electrical box for receiving the resilient member of FIG. 1.

An electrical box 110 that can be fitted with the resilient member as illustrated in FIG. 2 generally will include a bottom 112 and an annular side wall 114 that extends upwardly from the bottom. The top edge 116 of the side wall defines the surface opening 118 of the box. Wall 114 of the box includes a removable plug 120 for attachment of a conduit (not shown) if desired. The configuration of an appropriately sized resilient member is selected so that the top surface 102 of the resilient member fills the entire surface opening 118 of the box. The dimensions of the resilient member where it meets the surface opening (hereinafter "the corresponding member dimensions") should be at least 2% greater than the dimensions of the surface opening. Preferably, the height of the resilient member in its fully-expanded, uncompressed state will be equal to or greater than the height of the box. For example, resilient member 100 may be used with an electrical box 110 having a circular surface opening 118 having a radius of 2 inches and a side wall having a height of 3 inches. These dimensions of resilient member 100 ensure that the top surface of the resilient member will fill the entire surface opening of the box with the spring back of the resilient member insuring a proper seal around the surface opening to prevent the entry of viscous concrete.

Figure 3:
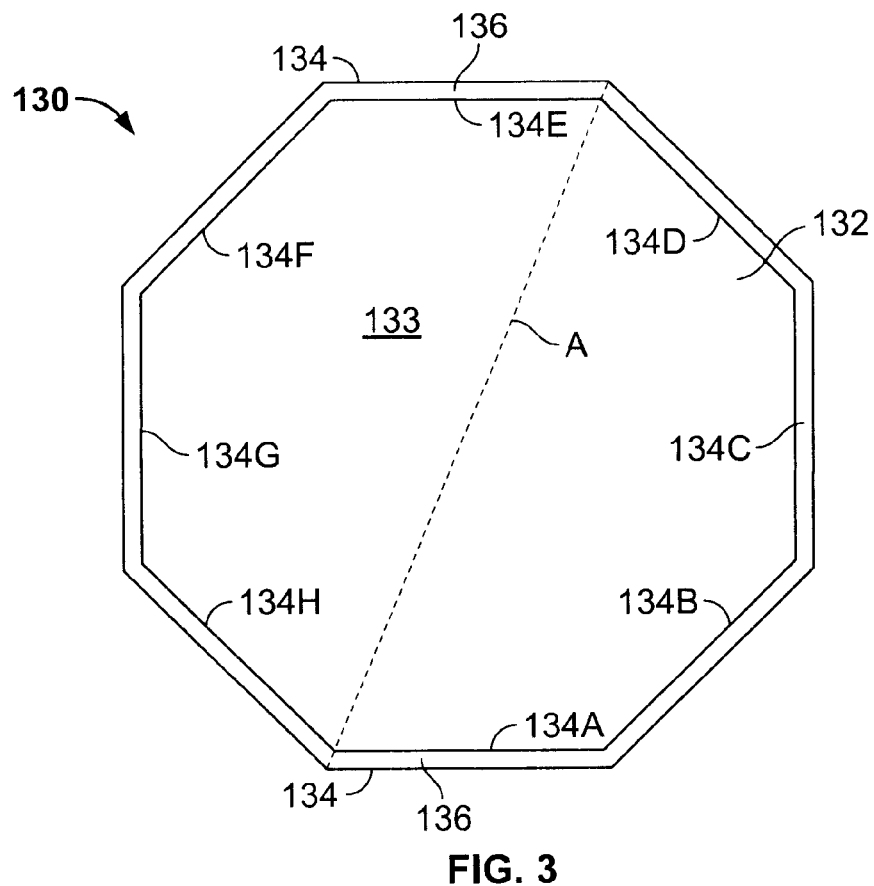
FIGS. 3-5 show views of other electrical boxes that may be used in the practice of the invention.
Figure 4:
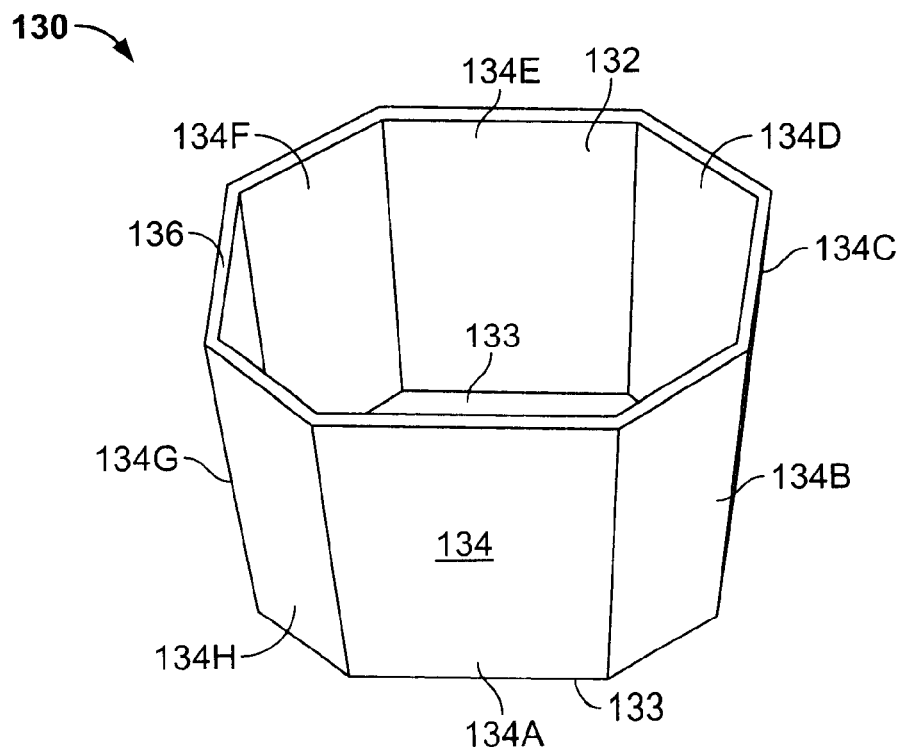

In another example, an electrical box 130 with an octagonal surface opening 132 is shown in FIGS. 3 and 4. Electrical box 130 generally will include a bottom 133 and a side wall 134 which extends upwardly from the bottom and encloses the perimeter of the box. The top edge 136 of the side wall defines surface opening 132 of the box. A resilient member that may be used in box 130 can be cylindrical in shape so long as it has a diameter that is greater than the largest diagonal "A" of the box and a height that is equal or greater than the height of the box 130. Preferably, however, the resilient member to be used in this box will have a top surface that is octagonal in shape to correspond to the shape of the surface opening of the box and corresponding member dimensions which are at least 2%, more preferably at least 10%, and most preferably greater than 20% longer than the corresponding dimensions of the side walls members 134A-134H which define the surface opening of box 130.

Figure 5:
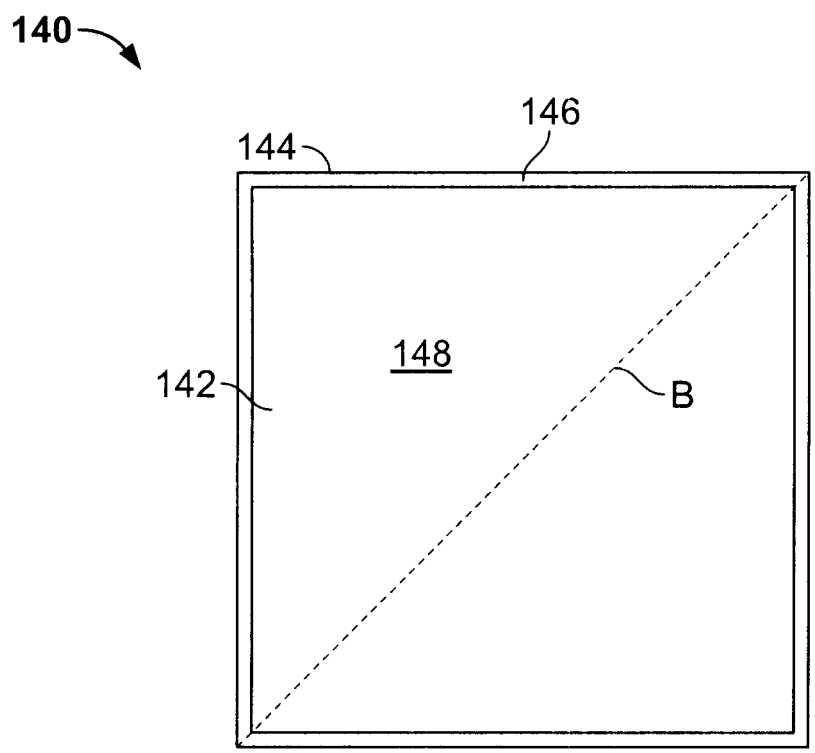

In another example, an electrical box 140 having a square surface opening 142 defined by the side walls of the box can be used, as shown in FIG. 5. A resilient member that may be used in box 140 can be cylindrical in shape so long as it has a diameter that is greater than the diagonal "B" of the box and a height that is equal to or greater than the height of the box 140. Preferably, the resilient member used in this box will have a top surface that is square in shape to correspond to the shape of the surface opening of the box and corresponding member dimensions which are at least 2%, more preferably at least 10%, and most preferably greater than 20% longer than the sides of box 140 which define the surface opening of the box.

Figure 6:
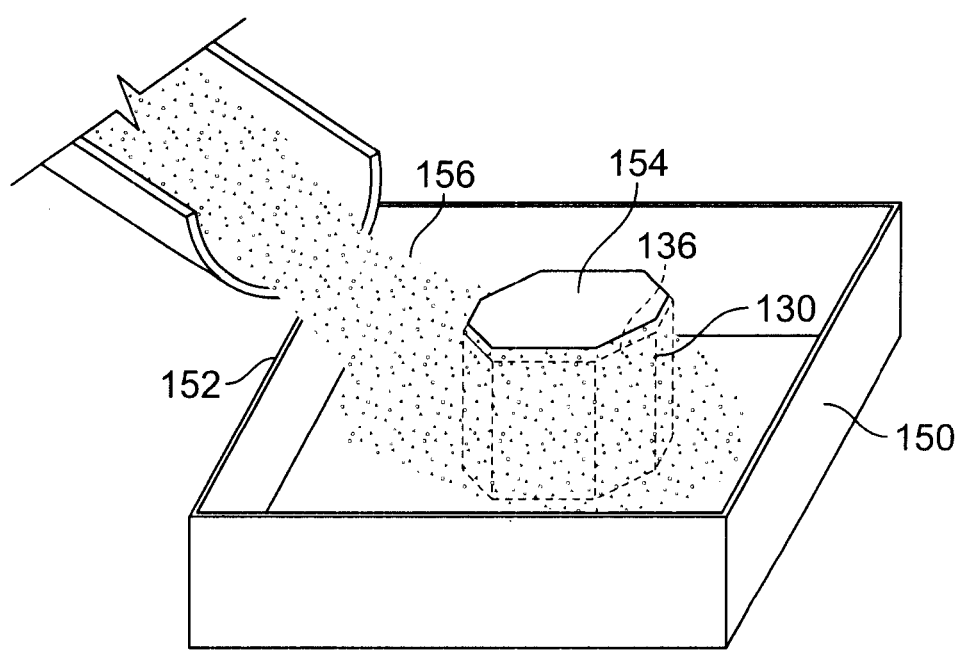
FIG. 6 illustrates the use of the present invention to prevent intrusion of poured concrete into an electrical box.

FIG. 6 illustrates an example method for preventing intrusion of viscous concrete into electrical box 130. This method comprises: 1) positioning the box in a concrete form 150 so that the surface opening of box 132 is generally coplanar with the surface level 152 of the form, as shown; 2) selecting resilient member 154 of the proper size and configuration for box 130 from a plurality of differently sized preformed resilient members; 3) compressing the resilient member as it is pressed into the box with the resilient member filling and blocking entry to the surface opening of the box and the spring back of the resilient member insuring a proper seal around the surface opening; and 4) once resilient member 154 is disposed inside electrical box 130 as shown, pouring viscous concrete 156 around electrical box 130, to fill form 150. Because the top surface of resilient member 154 occupies the entire surface opening of the box, the concrete will not intrude into electrical box 130. After the concrete has been poured and set, resilient member 154 will be removed from electrical box 130 which will be clear of concrete and available for use as desired. Also, resilient member 154 can be reused with other electrical boxes.

The invention also includes a method for providing a supply of resilient members of different shapes and sizes, those shapes and sizes corresponding to different shapes and sizes of electrical boxes. The method includes assembling a set of such differently sized resilient members that will be made available at a site where concrete is to be poured around electrical boxes. From this set of resilient members, members which correspond to each of the electrical boxes installed in the form are selected. Preferably, these selected members have a top surface that corresponds to the shape of the surface opening of the corresponding boxes and corresponding member dimensions which are at least 2%, more preferably at least 10%, and most preferably greater than 20% longer than the sides of the boxes which define the surface opening of the corresponding boxes into which the members are to be inserted. The selected resilient members are then inserted into their corresponding boxes. Concrete is poured around the electrical boxes and once the concrete has set the members are removed from their respective boxes, which will be clear of concrete.

In some instances the resilient member may be pre-installed in a box. In this case, builders would purchase an electrical box that already has a properly selected resilient member disposed inside of the box. This allows builders to use the combination electrical box and resilient member immediately in poured concrete construction applications, without having to select a proper resilient member and insert it into the box.

Finally, in some instances the resilient member may be cut from an elongated resilient member having the proper lateral dimensions to fill the surface opening of a selected electrical box. In this case, the elongated resilient member is inserted into an electrical box and cut to a height that is equal to or greater than the height of the box. The remaining portion of the elongated resilient member that was separated from the portion of the member used in the box is then inserted in succeeding boxes and cut as appropriate until the remaining portion of the elongated resilient member is too short to use further.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein. It should be understood that the illustrated embodiments are exemplary only, and should not be taken as limiting the scope of the invention.

What is claimed is:

1. A method for preventing intrusion of viscous concrete into an electrical box comprising:
   selecting an open electrical box having a surface opening defined by the sides of the box;
   selecting a compressible resilient member with a top surface that corresponds to the shape of the surface opening and has corresponding dimensions when uncompressed larger than the sides of the box;

compressing the resilient member and inserting the compressed resilient member into the electrical box so that it produces a seal at the surface opening; and pouring the viscous concrete over the electrical box.

2. The method of claim 1 wherein the resilient member is made of open celled polyurethane foam.

3. The method of claim 1 wherein the resilient member has a density between about 1.1 pounds per cubic feet and about 2.0 pounds per cubic feet.

4. The method of claim 1 wherein the height of the resilient member is equal to or greater than the height of the box.

5. The method of claim 1 further comprising the steps of:
removing the resilient member from the box; and
reusing the resilient member after the removing step.

6. The method of claim 1 including providing a plurality of resilient members and the resilient member selecting step includes choosing a resilient member from the plurality of resilient members.

7. The method of claim 1 further comprising the steps of:
providing an extended resilient member with a height that is greater than the height of the box;
inserting the extended resilient member into the electrical box; and
cutting the extended resilient member to a height that is generally equal to the height of the box.

8. An open electrical box protected from entry of viscous concrete comprising:
an open electrical box having a surface opening defined by the sides of the box;
a compressible resilient member fitted in the box wherein the top surface of the resilient member corresponds to the shape of the surface opening and the member has corresponding dimensions when uncompressed larger than the sides of the box; and
the member being located in the box in a compressed state so that the compressed resilient member produces a seal at the surface opening.

9. The electrical box of claim 8 wherein the height of the resilient member is equal to or greater than the height of the box.

10. The electrical box of claim 8 wherein the resilient member has a top surface that corresponds to the shape of the surface opening of the box and the resilient member top surface dimensions are larger than the dimensions of the surface opening of the box.

11. The electrical box of claim 8 wherein the resilient member is made of open celled polyurethane foam.

12. A method for preventing intrusion of viscous concrete into a plurality of differently sized electrical boxes having openings defined by the sides of the boxes comprising:
assembling a set of differently sized compressible resilient members including sizes corresponding to the sizes of the electrical boxes;
making the set of resilient members available at a site where concrete is to be poured around the differently sized electrical boxes;
positioning the boxes in one or more concrete forms;
selecting appropriate compressible resilient members from the set such that the compressible resilient members chosen have top surfaces when uncompressed that correspond to the shapes of the surface openings of the boxes and have corresponding dimensions larger than the sides of the boxes wherein when uncompressed the top surface areas of the resilient members are greater than the surface openings of the corresponding boxes;
compressing the selected resilient members and inserting the selected resilient members into the corresponding boxes;
pouring the viscous concrete into the forms;
allowing the concrete to set; and
removing the resilient members from the boxes.

13. The method of claim 12 further comprising reusing the resilient members after the removing step.

14. The method of claim 12 wherein the height of the resilient members is equal to or greater than the height of their corresponding boxes.

15. The method of claim 12 wherein the resilient members are made of open celled polyurethane foam.

* * * * *